Figure 1:
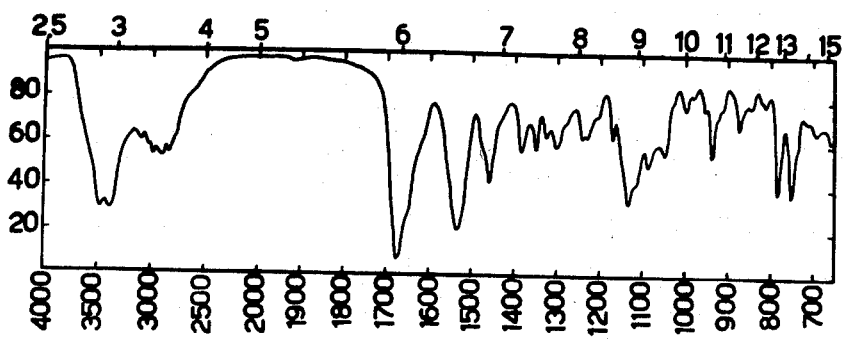

United States Patent Office 3,162,640
Patented Dec. 22, 1964

3,162,640
ALKALOID DERIVATIVES OF LYSERGIC ACIDS
Ernst Boris Chain, Cesare Bonino, and Antonio Tonolo, Rome, Italy, assignors to Società Farmaceutici Italia, Milan, Italy, a corporation of Italy
Original application Dec. 7, 1960, Ser. No. 74,392, now Patent No. 3,060,104, dated Oct. 23, 1962. Divided and this application Jan. 10, 1962, Ser. No. 169,989
Claims priority, application Italy July 19, 1960
2 Claims. (Cl. 260—285.5)

This invention relates to new alkaloid derivatives of lysergic acids, which derivatives are useful for conversion to lysergic acids, and which evidence good pharmacological activity, especially in respect to the D-lysergic acid derivative.

This application is a division of application Serial No. 74,392, filed December 7, 1960, now Patent No. 3,060,104.

The applicants' copending U.S. patent application Serial No. 41,031, filed July 6, 1960, now Patent No. 3,038,840, describes a process for the production of alkaloid derivatives of lysergic acid by fermenting, under aerobic conditions, an aqueous nutrient medium containing a source of carbon, nitrogen and mineral salt with a new strain of *Claviceps paspali* Stevens and Hall.

By carrying out the process as described in said application, a mixture of alkaloids is obtained comprising, prevailingly, D-lysergic acid amide and D-isolysergic acid amide. We have found now that if, after filtering off the mycelium, the extraction of the culture broth is carried out under particular conditions of temperature and pH, two new alkaloid derivatives of D-lysergic acid and D-isolysergic acid, having a carbinolamidic structure, are prevailingly obtained.

The process of the invention comprises filtering a culture broth produced by the fermentation in submerged culture of virulented strains of *Claviceps paspali* Stevens and Hall, whose preparation is described in said application, from the mycelium, and extracting the broth with an organic solvent at a pH between 7 and 9 and a temperature between 0° C. and 10° C.

The process of the invention is described in greater detail as follows:

Culture broths containing about 500–1500 γ/cm.³ of alkaloids (determined colorimetrically as ergometrine) which are produced by fermentation, in submerged culture, of virulented strains of *Claviceps paspali* Stevens and Hall, as described in said application, are filtered from the mycelium, cooled to a temperature in the range of 0° C. to 10° C., preferably 5° C., and the pH adjusted to between 7 and 9, preferably 8, by adding alkali metal carbonates or bicarbonates, such as sodium or potassium carbonate or bicarbonate. The extraction of the alkaloids is carried out with an organic solvent cooled in the range of 0° to 10° C., such as chloroform or n-butanol or a mixture thereof, or ether, benzene, ethyl acetate or amyl acetate. Other solvents utilizable here are simply determined by making solubility tests on the alkaloids.

The alkaloids may then be concentrated and purified by several (i.e., 3–4) successive transfers from the organic solvent to an acidic aqueous phase, such as aqueous 0.1 M tartaric acid, and vice versa, the pH of the aqueous phase being adjusted before the extraction with the organic solvent between 7 and 9 and the temperature always between 0° and 10° C.

The new alkaloid derivative of D-lysergic acid is obtained by crystallization from the organic solvent, whilst the isomeric derivative of D-isolysergic acid is isolated in small amounts from the mother liquor. The new alkaloids may also be isolated by the formation of their maleates in ether solution followed by precipitation and fractional crystallization, or by an equivalent purification process.

It is an advantage of the process of the invention that the derivative of D-lysergic acid is prevailingly obtained, at the expense of the derivative of D-isolysergic acid, which is known to be of less pharmacological interest than the corresponding isomer of D-lysergic acid.

The two new alkaloids of the invention have the empirical formula $C_{18}H_{21}O_2N_3$ and when they are reacted with maleic acid in ether the corresponding maleates, having the empirical formula $C_{22}H_{25}O_6N_3$, are obtained.

Acidic or alkaline hydrolysis of the new alkaloids of the invention yields acetaldehyde, which may be determined both qualitatively and quantitatively by the formation of a dinitrophenyl-hydrazone. The D-lysergic acid amide or D-isolysergic acid amide as the case may be, which may be isolated from the reaction mixture, may be estimated by an alkaline hydrolysis according to Smith and Timmis, J. Chem. Soc. 1936, 1440, which produces D-lysergic acid or D-isolysergic acid, as the case may be.

The new alkaloid derivatives of D-lysergic acid may be obtained from the isomeric derivatives of D-isolysergic acid and, vice versa, by the isomerizing processes similar to those described in the literature, viz., Smith and Timmis, J. Chem. Soc. 1936, 1166.

The U.V. spectra are identical to those of other derivatives of D-lysergic acid and D-isolysergic acid ($\lambda_{max}$ at 242 m$\mu$ and 312 m$\mu$).

The following table lists other physical-chemical properties of the two new alkaloids.

TABLE

| Property | Derivative of D-lysergic acid | Derivative of D-isolysergic acid |
|---|---|---|
| Melting point | 135° C. (decomposition beginning) | 70° C. (decomposition beginning). |
| Melting point of maleate | 150° C. (dec.) | |
| $[\alpha]_D^{22}$ (1% in dimethylformamide) | +29°±2° | |
| Solubility | Soluble in lower alcohols, dimethylformamide, pyridine. Sparingly soluble in cool chloroform, ether, benzene, water. Insoluble in petroleum ether. | Soluble in lower alcohols, pyridine, chloroform, acetone, ethyl acetate dimethylformamide. Sparingly soluble in ether, benzene, water. |
| $R_f$-(Butanolacetic acid-water 4:1:5) | 0.64—0.70 | 0.73—0.77. |
| $RE = R_f$ new alkaloid/$R_f$ ergometrine. | 0.97 | 1.10. |
| I. R. Spectrum: | | |
| Evident maxima (in $\mu$) | 2.94; 3.03; 5.99; 6.55; 6.88; 8.85; 12.76; 13.31. | 3.05; 3.41; 6.02; 6.52; 6.89; 7.27; 7.44; 7.72; 7.91; 9.22; 12.42; 12.81; 13.32. |
| Less evident maxima (in $\mu$) | 3.29; 3.42; 3.52; 3.60; 7.25; 7.43; 7.57; 7.72; 8.10; 8.15; 8.58; 9.23; 9.56; 10.02; 10.69; 11.46. | 3.28; 3.51; 3.57; 5.81; 8.11; 8.22; 8.58; 9.48; 9.60; 10.12; 10.78; 11.56; 11.89; 14.39. |
| Inflection points (in $\mu$) | 6.08; 7.84; 8.31; 8.98; 13.55 | 6.23; 8.77. |

Because of the chemical behavior of the two new products of the invention, the chemical structure of said compounds is

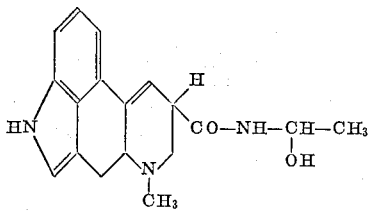

one alkaloid being a derivative of D-lysergic acid and the other a derivative of D-isolysergic acid.

The new alkaloids, especially the derivative of D-lysergic acid, show good pharmacological activity as oxytocic substances and are useful as intermediates in the manufacture of D-lysergic acid by the known processes of the literature.

The invention is illustrated by the following examples in which Example 1 illustrates the conditions for obtaining the amides of D-lysergic acid and D-isolysergic acid and Example 2 gives the details for obtaining the two new alkaloids of the invention. Example 2 is therefore the preferred process here.

*Example 1.—Small Amounts of the New Alkaloids are Obtained*

23 liters of a fermentation broth, obtained as described in said copending application, and containing 800 γ/ml. of alkaloids (determined colorimetrically as ergometrine) are filtered from the mycelium and the pH is adjusted to 8 with a diluted aqueous solution of sodium hydroxide. The alkaloids are extracted at room temperature with a chloroform n-butanol mixture (4:1); from the organic extract the alkaloids are extracted with an aqueous solution of diluted (1:100) sulphuric acid. The acidic aqueous extract is then made alkaline, to pH 8, and extracted twice with 1500 ml. of chloroform. The chloroform extract is dried over sodium sulphate and concentrated under vacuum to about 600 ml. Upon cooling 3.07 gm. of D-lysergic acid amide are obtained (M.P. 240° C. after recrystallization from aqueous acetone).

The mother liquor is further concentrated and the residue treated with petroleum ether. A precipitate forms, is filtered, dried and extracted with chloroform. D-isolysergic amide is obtained (M.P. 120–130° C. with decomposition, after recrystallization from methanol). The part which is insoluble in chloroform comprises a mixture of D-lysergic acid amide and small amounts of the two new alkaloids of the invention, which may be isolated as pure products with great difficulty by fractional crystallization or other industrially applicable methods.

*Example 2.—For Obtaining the New Alkaloids*

460 ml. of a filtered (to remove mycelium) culture broth, obtained according to the process described in said copending application and containing 450 γ/cm.³ of alkaloids (determined colorimetrically as ergometrine), are cooled to 5° C. and the pH is adjusted to 8 by adding sodium bicarbonate. The alkaloids are extracted with chloroform cooled to 2 to 5° C. (about 500 ml.) and the chloroform extract is extracted with 50 ml. of aqueous 0.1 M tartaric acid. Several transfers (3–4) are carried out between the organic solvent and the dilute tartaric acid and, by operating in the temperature range of 0° to 10° C. and by adjusting the pH of the aqueous phase before the extraction with organic solvent between 7 and 9, a final chloroform extract of about 20 ml. is obtained.

*Example 3.—Degradation of New Alkaloid Derivative of D-Lysergic Acid to D-Lysergic Acid Amide*

96 mg. of alkaloid derivative of D-lysergic acid, dissolved in 1.5 ml. of water and 1.5 ml. of ethanol in the presence of catalytic amounts of alkali or acid, are heated for one hour under nitrogen stream. The outgoing gas is passed through a 0.2% solution of dinitrophenylhydrazine in 5 N HCl: from said solution 33 mg. of acetic aldehyde dinitrophenylhydrazone are obtained.

By cooling the reaction mixture, 42 mg. of D-lysergic acid amide are obtained.

In the same manner, D-isolysergic acid amide is obtained from the new alkaloid derivative of D-isolysergic acid.

*Example 4.—Degradation of New Alkaloid Derivative of D-Lysergic Acid to D-Lysergic Acid*

236 mg. of alkaloid derivative of D-lysergic acid are heated in methanolic 1 N KOH for one hour. Ammonia is evolved from the reaction mixture. The solution is acidified with 4 N acetic acid: 121 mg. of D-lysergic acid are obtained.

In the same manner the reaction may be carried out on D-lysergic acid amide.

From alkaloid derivative of D-isolysergic acid, D-isolysergic acid is obtained.

Figure 2:
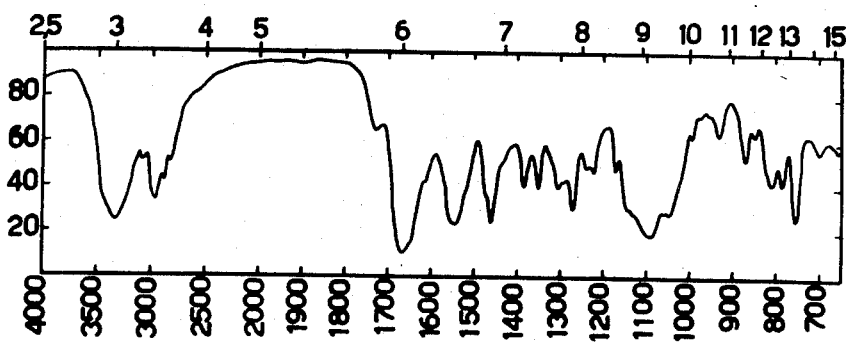

By operating at 0° C., 18 mg. of the D-lysergic acid derivative of the invention are obtained: M.P.=135° C. with decomposition; $[\alpha]_D^{22}=+29\pm2$ (1% in dimethylformamide); $\lambda_{max}$ at 242 mμ and 312 mμ; I.R. spectrum as illustrated in FIG. 1 of the accompanying drawing; empirical formula $C_{18}H_{21}O_2N_3$. From the mother liquor, by concentration under vacuum, filtration of the precipitate and succeeding fractional crystallization, small amounts of the D-isolysergic acid derivative of the invention are obtained: M.P.=70° C.; $\lambda_{max}$ at 242 mμ and 312 mμ; I.R. spectrum as illustrated in FIG. 2 of the accompanying drawings; empirical formula $C_{18}H_{21}O_2N_3$.

The new two alkaloids, dissolved in methanol react with maleic acid in ether, to give the corresponding maleates having the empirical formula $C_{22}H_{25}O_6N_3$.

The two new alkaloids may be obtained also through the formation of their maleates, by treatment with maleic acid in ether solution followed by fractional crystallization.

Each of the two new compounds may be transformed into an equilibrium mixture of the two isomeric forms, from which both the forms may be isolated, by treatment under acidic conditons, for instance in 10% aqueous acetic acid at 80° C. for one hour, rendering alkaline at low temperature, extraction with chloroform and finally fractional crystallization. For example, in this way the total yield of the new alkaloid of D-lysergic acid can be increased, by conversion of the alkaloid of D-isolysergic acid into the alkaloid of D-lysergic acid.

Either or both the new alkaloids can be degraded into D-lysergic acid or D-isolysergic acid, respectively, by methods known to the art in respect to other amides of said acids, by hydrolysis under alkaline or acid conditions. This can be used to increase the total yield of either of said acids, if desired.

In order that the instant disclosure be complete in itself, we incorporate below the fermentation processes described in our copending application Serial No. 41,031.

The following relates to a process for the production of alkaloid derivatives of lysergic acid, by submerged fermentation with new strains of *Claviceps paspali* Stevens and Hall, from which derivatives pure lysergic acid can be obtained in known manner.

Nowadays the alkaloid derivatives of lysergic acid are generally obtained from ergot, that is from natural sclerotia of *Claviceps purpurea* (Fr.) Tul. A. The investigators Stoll. et al. (U.S.P. 2,809,920) have recently reported the production of such alkaloids by saprophytic surface culture of a suitable strain of *Claviceps purpurea* (Fr) Tul. isolated from rye. Others (Abe et al.: J. Agric. Chem. Soc. Japan 25, 1952, p. 458; Taber et al: Canad. J. of Microbiology 4, 1958, p. 611) have described processes for the preparation of alkaloids by saprophytic surface culture of some particular strains of Claviceps. However such alkaloids do not contain lysergic acid in their molecule and are different from those obtained by natural sclerotia of *Claviceps purpurea* (Fr.) Tul.

In all these investigations, carried out over many years, the production of the alkaloids occurs only by saprophytic surface culture after 20–40 days of incubation and besides the unitary production is so low as to be impractical.

More recently, Spruson et al. (Australian P. 34,313/58) have described a process for the biosynthetic production of ergot alkaloids by the cultivation of *Claviceps purpurea* Tul., under essentially anaerobic conditions and with a substantial reduction of cell respiration. Such conditions present a number of evident disadvantages.

The process of the present invention facilitates the production of lysergic acid derivatives alkaloids in high yields, through a submerged culture of new strains of Claviceps, under aerobic conditions and stirring, without causing a reduction of the cell respiration. This signifies that the formation of alkaloids of lysergic acid can be carried out by an industrial fermentation.

The organisms employed for the process of the present invention are new strains of *Claviceps paspali* Stevens and Hall. It had been found that the strains *Claviceps paspali* Stevens and Hall, which do not produce the lysergic acid derivatives alkaloids by submerged culture, may be virulented artificially, to give new strains of *Claviceps paspali*, which in turn allow said production.

The artificial virulentation occurred as follows. Strain F. 97 was isolated from sclerotia grown on plants of *Paspalum disticum*, collected at Tivoli (Rome) and identified and classified as *Claviceps paspali* Stevens and Hall. Embryos of Rosen 4 n rye were inoculated, before germination, with the strain F. 97 and then cultivated "in vitro." The new virulented subspecies were isolated from sclerotia obtained on said embryos.

The strains which are used in the process of the present invention and are described as new strains of *Claviceps paspali* Stevens and Hall in this specification and the claims thereof have been filed at the Istituto Superiore di Sanita, Viale Regina Elena 299, Rome (Italy), and denominated by the marks: F–140; F–S13/1; F–237; F–240. The American Type Culture Collection of Washington has assigned to the strains F/s 13/1, F/237, F/240 and F/140 of *Claviceps paspali* ATCC numbers 13892, 13893, 13894 and 13895, respectively.

The process of the invention is therefore one for the production of alkaloid derivatives of lysergic acid which comprises fermenting under aerobic conditions an aqueous nutrient medium containing a source of carbon, nitrogen and mineral salt with a new strain of *Claviceps paspali* Stevens and Hall as hereinbefore defined.

The above-said strains have the following morphological characteristics: the colonies, obtained in agar glucose-potato on Petri dishes, have a diameter of 1.5–3 cm. after 10–15 days of cultivation at 27° C.; they are round, having a continuous border and smooth surface, showing a white-grey aerial mycelium and a brown or dark vegetative mycelium. The aerial mycelium, velvety and somewhat fasciculated, is constituted by either simple or synnematic hyphae, which have a diameter of 3–4μ and septa at a distance of 20–50μ, containing droplets of fat. The vegetative mycelium is a mat of compact hyphae which have changed their original structure in a pseudoparenchyma with selerotal structure. In fact the cells have a polygonal form with a diameter of 3–4 x 10–15μ, being tightly bound and showing a great number of droplets of fat material. The presence of conidia or clamydospores has never been observed. Sporulation has never been obtained even by changing the sources of carbon or nitrogen in the media.

If the colony surface is scratched by a needle the vegetative mycelium, which lies under the aerial mycelium, presents a ink or fleshy color. The above-said characteristics represent a particular feature of these strains, that have never been observed in other strains of Claviceps isolated.

In submerged culture the mycelium forms groups of small round or irregular pellets, having sizes of 0.1–1 x 0.5–3 cm., somewhat loose, which are constituted by synnemata formed by tightly bound hyphae. The hyphae have a diameter of 3–5μ and are straight with very few lateral branchings. The hyphae contain a great number of droplets of fat, even at the early stages. The mycelium, in submerged culture, may have a yellow, brown, grey-green or green color, according to the different media and to the age.

As regards the production of alkaloid derivatives of lysergic acid, the present invention is not limited to the use of the described strains, but comprises also the mutants thereof, which may be obtained, e.g., by means of either a selection or a mutation by the action of U.V. rays or Roentgen rays or any other mutagenous substance or, particularly, by artificial infection of either embryos or grasses cultivated in vitro or plants of grasses cultivated both in vivo or in vitro and the said mutants are to be included in the definition of a new strain of *Claviceps paspali* Stevens and Hall.

According to our invention the process is preferably carried out by cultivating the above-described organisms, in aerobic conditions and in submerged culture, both in laboratory flasks and in industrial fermentors, in an aqueous nutrient solution which contains: inorganic salts, nitrogen sources and carbohydrates or their suitable compounds acting as carbon sources, until a high yield of alkaloids is obtained.

As regards the inorganic salts, they may be chlorides and/or nitrates and/or carbonates and/or sulphates and/or phosphates of alkaline metals, earth alkaline metals, magnesium, iron, zinc and manganese but preferably $MgSO_4$ and $KH_2PO_4$.

The behavior of the strains described in the present invention when grown in presence of $Fe^{++}$ and $Zn^{++}$ in the medium, is different from that of the strains of *Claviceps purpurea* described by Stoll et al. (U.S.P. 2,809,920). These two elements may decrease the production of alkaloids markedly.

The nitrogen sources may be ammonium salts such as citrate, tartrate, malate, succinate, oxalate, acetate and the like; amino acids and their mixtures, peptides or proteins, their hydrolysates, meat extracts, hydrosoluble fractions of cereal-like corn or wheat; corn malt extract, corn-steep liquor, soya-bean meal, peanut meal, chick-pea meal, cotton bean meal.

The carbohydrates may be glucose, sucrose, starch, dextrins, sorbitol, mannitol, lactose and the like.

The cultivation can be accomplished under aerobic conditions, in surface culture or preferably in submerged culture; it may be carried out either in laboratory flasks or in fermentors, under stirring or still conditions and maintaining aerobiosis with air or oxygen. The fermentation is carried out at a temperature from 22° to 30° C., preferably at 27° C. and at pH range from 4.2 to 6, preferably at 5.2. The production of the alkaloids generally starts after two days of culture, reaching the optimum after 7–9 days.

The evaluation of alkaloids content may be effected on the basis of color tests by the Van Urk reaction (Pharm. Weekbled 66, 1929, p. 473) after extraction as follows: the culture broth is alkalinized to pH 8 and extracted first with chloroform and then re-extracted with the aqueous acidic solution (e.g., 1% $H_2SO_4$ or 2% tartaric acid) which is used for the colorimetric analysis of alkaloids.

The usual procedures of extraction with suitable organic solvents, such as benzene, chloroform, methylene chloride and the like, or absorption with the known absorbent means, such as charcoal, bentonite and the like, under alkaline conditions, may be used for the separation and isolation of the mixture or the obtained alkaloids. The mixture, in which lysergic acid amide and isolysergic acid amide are prevalently present, can then be hydrolyzed with alkali, in known manner, to lysergic and isolysergic acid (J. Chem. Society, 1934, p. 674, and 1936, p. 1440).

The details of the cultivation will be illustrated by the following examples.

*Example 1'*

The process is carried out in 500 ml. flasks containing 100 ml. of a suitable nutrient medium. The flasks are shaken by a rotary shaker (200 revolutions/minute; eccentric throw: 10 cm.). The optimal incubation temperature is at 27° C. The relative moisture is 85–90%. The cultivation is carried out in the dark. A flask is inoculated with the mycelium which is obtained from a 10 days' culture in potato-glucose-agar of one of the above-described new strains of *Claviceps paspali* Stevens and Hall. The nutrient medium is the following:

| | Percent |
|---|---|
| Mannitol | 5 |
| Succinic acid | 1 |
| $KH_2PO_4$ | 0.1 |
| $MgSO_4 \cdot 7H_2O$ | 0.03 |
| Chick-pea meal | 0.1 |
| Distilled water. | |

The pH is adjusted to 5.2 with aqueous ammonia solution.

A homogeneous culture is generally formed on a rotary shaker after 7–10 days' incubation and it is constituted by a mass of synnematic hyphae. A part, 10%, of such a culture is used as a seed for the prefermentation culture which is carried out in flasks containing the same medium. After 4 days' cultivation the fermentation flasks are inoculated with 10% of the mycelium grown in the prefermentation flask.

The fermentation medium for the production of the alkaloids has the following composition:

| | Percent |
|---|---|
| Mannitol | 5 |
| Succinic acid | 3 |
| $KH_2PO_4$ | 0.1 |
| $MgSO_4 \cdot 7H_2O$ | 0.03 |
| Distilled water. | |

The pH is adjusted to 5.2 with aqueous ammonia solution.

In this medium, the average production of alkaloids reaches 1000 μg./ml. after 7–9 days' incubation.

Ten liters of culture broth, obtained by 110 fermentating flasks, are filtered and the mycelium is discarded since it contains a very low amount of alkaloids. The filtered dark colored broth (which contains about 1000 μg./ml. of alkaloids) is made alkaline by adding sodium carbonate or sodium hydroxide solution and extracted with 10 lt. of a mixture chloroform-isobutanol (4:1). The organic extract is re-extracted with an aqueous 2% tartaric acid solution. The aqueous acidic solution is then concentrated under vacuum and at 20–40° C. to a small volume (about one-tenth of the original volume). The residual solution is made alkaline, extracted with chloroform and the solvent evaporated. A white crystalline powder is obtained, from which, by alkaline hydrolysis in known manner, lysergic and isolysergic acid are obtained.

*Example 2'*

The cultivation is carried out with the following nutritive medium:

| | Percent |
|---|---|
| Mannitol | 5 |
| Malic acid | 3 |
| $KH_2PO_4$ | 0.1 |
| $MgSO_4 \cdot 7H_2O$ | 0.03 |
| Distilled water. | |

The pH is adjusted to 5.2 with aqueous ammonia solution.

The fermentation is carried out according to the procedure described in Example 1'. After 7–9 days' incubation, the production of alkaloids reaches the value of 1000 μg./ml. The same yield is obtained if tartaric acid, citric acid, malic acid, acetic acid, fumaric acid, succinic acid are used.

*Example 3'*

The cultivation is carried out with the following nutrient medium:

| | Percent |
|---|---|
| Sorbitol | 5 |
| Malic acid | 3 |
| $KH_2PO_4$ | 0.1 |
| $MgSO_4 \cdot 7H_2O$ | 0.03 |
| Distilled water. | |

The pH is adjusted to 5.2 with aqueous ammonia solution.

The fermentation is carried out according to the procedure described in Example 1'. After 7–9 days' incubation, the production of alkaloids reaches 1000 μg./ml.

*Example 4'*

The cultivation is carried out with the following nutrient medium:

| | Percent |
|---|---|
| Mannitol | 4 |
| Glucose | 1 |
| Succinic acid | 2 |
| $KH_2PO_4$ | 0.1 |
| $MgSO_4 \cdot 7H_2O$ | 0.03 |
| Chick-pea meal | 0.5 |
| Distilled water. | |

The pH is adjusted to 5.2 with aqueous ammonia solution.

The fermentation is carried out according to the procedure described in Example 1'. After 7–9 days' incubation, the production of alkaloids reaches to 1400–1600 μg./ml.

Other suitable nitrogen sources are: soyabean meal, peanut meal, bean meal, lentil meal, pea meal, potato meal, hydrolyzed casein, yeast extract, corn-steep liquor and the like.

*Example 5'*

The fermentation is carried out in glass fermentors having a ratio $h/D$ not less than 3. Four liters of the following nutrient medium are poured into each fermentor.

| | Percent |
|---|---|
| Mannitol | 5 |
| Succinic acid | 3 |
| $KH_2PO_4$ | 0.1 |
| $MgSO_4 \cdot 7H_2O$ | 0.03 |
| Distilled water. | |

The pH is adjusted to 5.2 with aqueous ammonia solution.

The sterilization is effected in an autoclave for 20 minutes at 100° C. and for 40 minutes at 120° C. The fermentors are aerated from the bottom through a sintered glass sparger. The foam is controlled by adding the usual anti-foaming agents such as Vaseline oil (Vaseline is a registered trademark) containing 6% Alkaterge and the like. The incubation temperature is kept at 27° C.

The inoculum is constituted by 400 ml. of the culture prepared as described in Example 1'. After 4–6 days' culture, the production of alkaloids reaches the optimum reported in Example 4'.

*Example 6'*

The nutrient medium has the following composition:

| | Percent |
|---|---|
| Sorbitol | 5 |
| Succinic acid | 1 |
| $KH_2PO_4$ | 0.1 |
| $MgSO_4 \cdot 7H_2O$ | 0.03 |
| Chick-pea meal | 1 |
| Distilled water. | |

The pH is adjusted to 5.2 with aqueous ammonia solution.

The fermentation is carried out as described in Example 5'.

After 4–7 days' culture the production of alkaloids reaches the optimum reported in Example 4'.

*Example 7'*

The fermentation is carried out in stainless steel fermentors which are four meters high and have a diameter of 0.2 m. 90 lt. of the following nutrient medium are poured into each fermentor:

|  | Percent |
|---|---|
| Mannitol | 5 |
| Succinic acid | 1 |
| $KH_2PO_4$ | 0.1 |
| $MgSO_4 \cdot 7H_2O$ | 0.03 |
| Chick-pea meal | 0.1 |
| Distilled water. | |

The pH is adjusted to 5.2 with aqueous solution.

The sterilization is effected in another suitable container, so that the cultivation liquid does not come into contact with the direct steam. In fact, it has been observed that the smallest traces of iron in the medium cause a decrease of the production of alkaloids. The inoculum is constituted by 9 lt. of a culture prepared as described in Example 1'. The air enters from the bottom through a porous sparger (1 volume air/1 volume liquid/1 minute).

After 6–9 days' incubation the same high yields of alkaloids reported in Example 4' are obtained.

*Example 8'*

The fermentation is carried out in stainless steel fermentors containing 50 lt. of the following medium:

|  | Percent |
|---|---|
| Mannitol | 4 |
| Glucose | 1 |
| Succinic acid | 2 |
| $KH_2PO_4$ | 0.1 |
| $MgSO_4 \cdot 7H_2O$ | 0.03 |
| Distilled water. | |

The pH is adjusted to 5.2 with aqueous ammonia solution.

The fermentation is effected under stirring and aeration. After 6–9 days' incubation high yields of alkaloids, as reported in Example 4', are obtained.

We claim:

1. The derivative of D-lysergic acid having the formula:

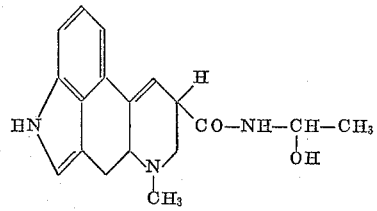

2. The derivative of D-isolysergic acid having the formula:

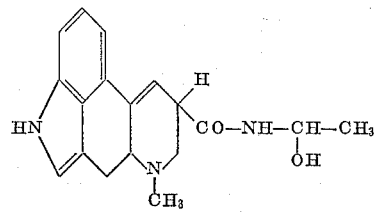

References Cited in the file of this patent

Stoll et al.: Helv. Chim. Acta, volume 26, pages 944–965 (1943), pages 956–957 relied on.